United States Patent
Harmon

[15] 3,698,103
[45] Oct. 17, 1972

[54] SPEED READING MACHINE

[72] Inventor: Peter E. Harmon, 4339 Bellaire Avenue, North Hollywood, Calif. 91604

[22] Filed: Jan. 13, 1969

[21] Appl. No.: 790,760

[52] U.S. Cl. ..................................................35/35
[51] Int. Cl. ............................................G09b 17/04
[58] Field of Search.....................................35/35.2

[56] References Cited

UNITED STATES PATENTS

| | | | |
|---|---|---|---|
| 2,162,766 | 6/1939 | Taylor | 35/35.2 |
| 3,400,473 | 9/1968 | Nunn | 35/35.2 |

*Primary Examiner*—Wm. H. Grieb
*Attorney*—Spensley, Horn and Lubitz

[57] ABSTRACT

A device for developing reading speed and comprehension comprising a variable speed pacing member which traverses a page of reading material from the top to the bottom thereof in a series of predetermined steps or hesitations. The pacing member includes a plurality of cam-actuated spacing shutters which, when viewed from above, sequentially expose laterally adjacent areas of the underlying reading material so that during each hesitation, or step, of the pacing member, the reader sees first one area of the reading material, while the like area adjacent thereto is blocked from view; and then, in sequence, sees the laterally adjacent area while the preceding area is blocked from view. The pacing shutter may be adjusted to vary the size of the area of reading material exposed thereby according to the nature of the reading material and the state of the trainee's development.

6 Claims, 11 Drawing Figures

PETER E. HARMON
INVENTOR.

BY Spensley & Horn
ATTORNEYS

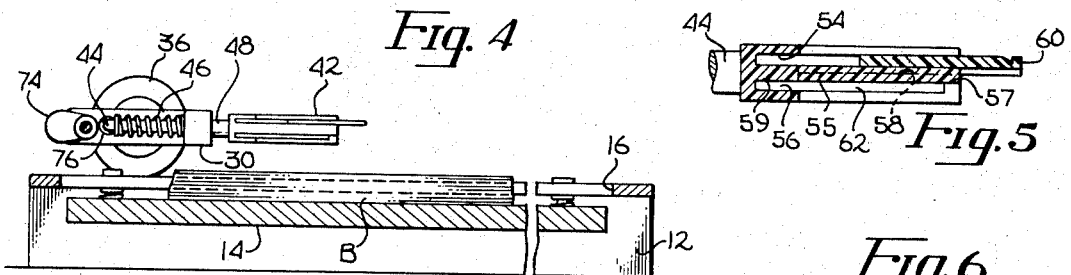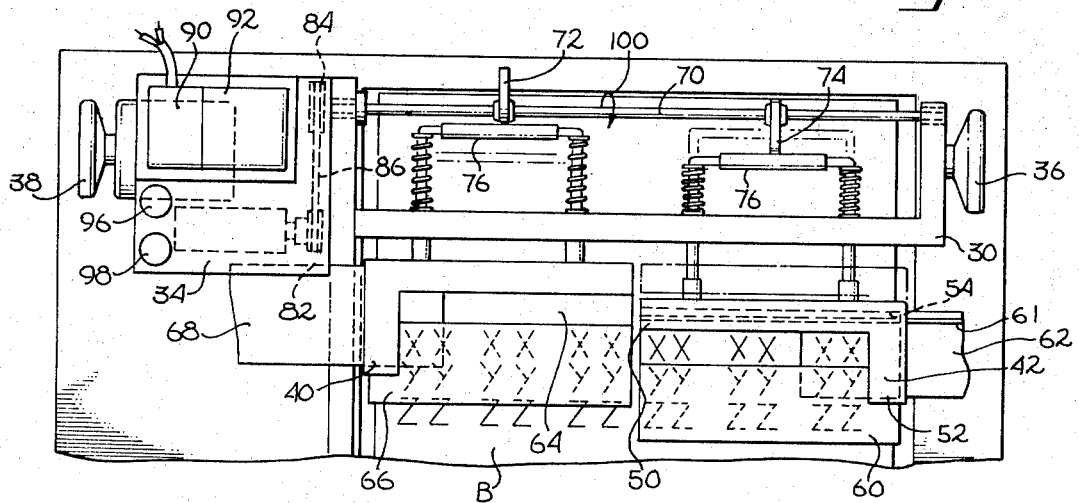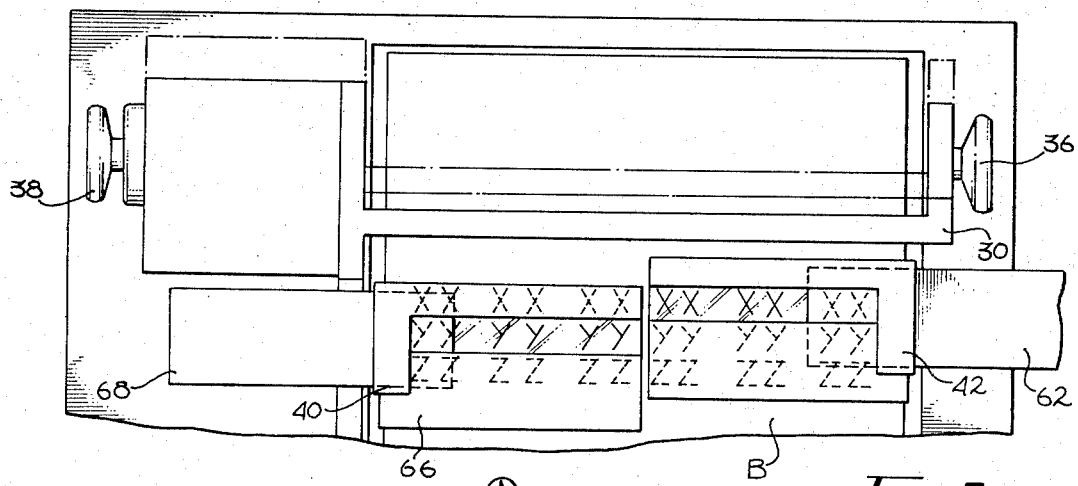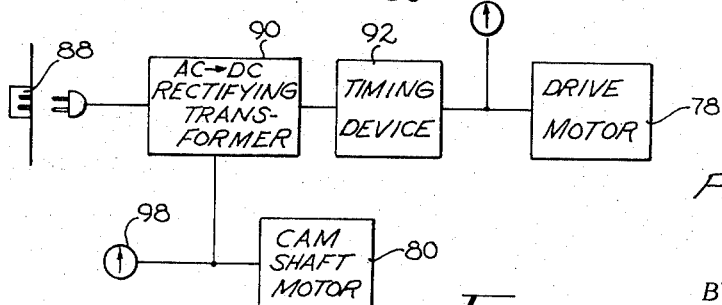

PETER E. HARMON
INVENTOR.

BY
Spensley & Horn
ATTORNEYS

SPEED READING MACHINE

BACKGROUND OF THE INVENTION

1. Field of the Invention

The present invention relates to language training devices and more particularly to devices for developing reading speed and comprehension.

2. Description of the Prior Art

The art to which the present invention pertains is replete with various devices designed to improve reading speed. Such devices employ a bar-like member extending across the material to be read and various means for driving such member down the length of the reading material at a predetermined rate so that all of the words of a given line of the reading material are simultaneously exposed to the reader. Such devices also include various means for adjusting the rate at which such members traverse the reading material.

The major shortcoming of each of the various devices presently known to the art is that they are not adaptable for use with more recently developed reading training techniques. It has been found that reading rates and comprehension may be increased many fold by first developing the rate at which a reader's comprehension may be meaningfully shifted from one "reading area" to the next sequential area and then repeating and coupling the rate increasing process with gradual relative expansion of the "reading area" to encompass more printed matter. The devices presently known in the art are limited to line-by-line reading rate progression by their structural nature. Accordingly, the present invention has been invented to provide a means for developing reading speed and comprehension compatible with advanced speed reading techniques and to overcome the shortcomings of the present art.

SUMMARY OF THE INVENTION

The present invention is best summarized as a reading training device comprising a base member; pacing means adapted for rectilinear, interrupted traversal of reading material placed upon said base member, said pacing means being constructed to sequentially expose progressive areas of said reading material during traversal thereof; and, means for imparting motion to said pacing means.

As opposed to devices presently known in the art, the present invention directs the reader's attention to a specifically defined area of the material to be read in a sequential, rhythmic manner. In this fashion, starting with relatively slow traversal speeds, the reader learns to visually fix upon all of the printed material within the area defined by the spacing shutters and develops the ability to retain all of what he sees and apply it to the next sequential area disclosed by the adjacent shutter. As the reader's skill increases, the area of exposure may be enlarged and the rate with which the reader's attention is shifted from one group to the next sequential group may be increased while continually instilling and developing the reader's ability to fixate in the group rhythm manner found to be of value in recently developed reading techniques.

Accordingly, it is an object of the present invention to provide means for assisting readers in their development of reading skills.

It is a further object of the present invention to provide a reading training device adaptable for use with recently developed reading techniques.

It is yet a further object of the present invention to provide a reading training device which specifically directs the reader's attention to one area of the reading material, while effectively blocking the next area from view, and then directs the reader's attention to the next sequential area in a predetermined rhythmic manner.

A further object of the present invention is to provide a reading training device of the character described that is adaptable for use with varying thicknesses of reading materials.

The present invention together with additional advantages thereof, will be better understood with reference to the following detailed description of an illustrative embodiment and the accompanying drawings.

BRIEF DESCRIPTION OF THE DRAWINGS

In the drawings, wherein the same reference numerals are ascribed to like parts wherever they appear:

FIG. 4 is a partial cross-section view taken along the line 4—4 of FIG. 2;

FIG. 5 is a cross-section view of a portion of an embodiment of the present invention taken along the line 5—5 of FIG. 2;

FIGS. 6 and 7 are partial top plan views of an embodiment of the present invention showing the intermovement of the parts thereof during an operative cycle;

FIG. 8 is a block diagram of the electrical components of an embodiment of the present invention;

DETAILED DESCRIPTION OF AN EMBODIMENT

Figure 1:
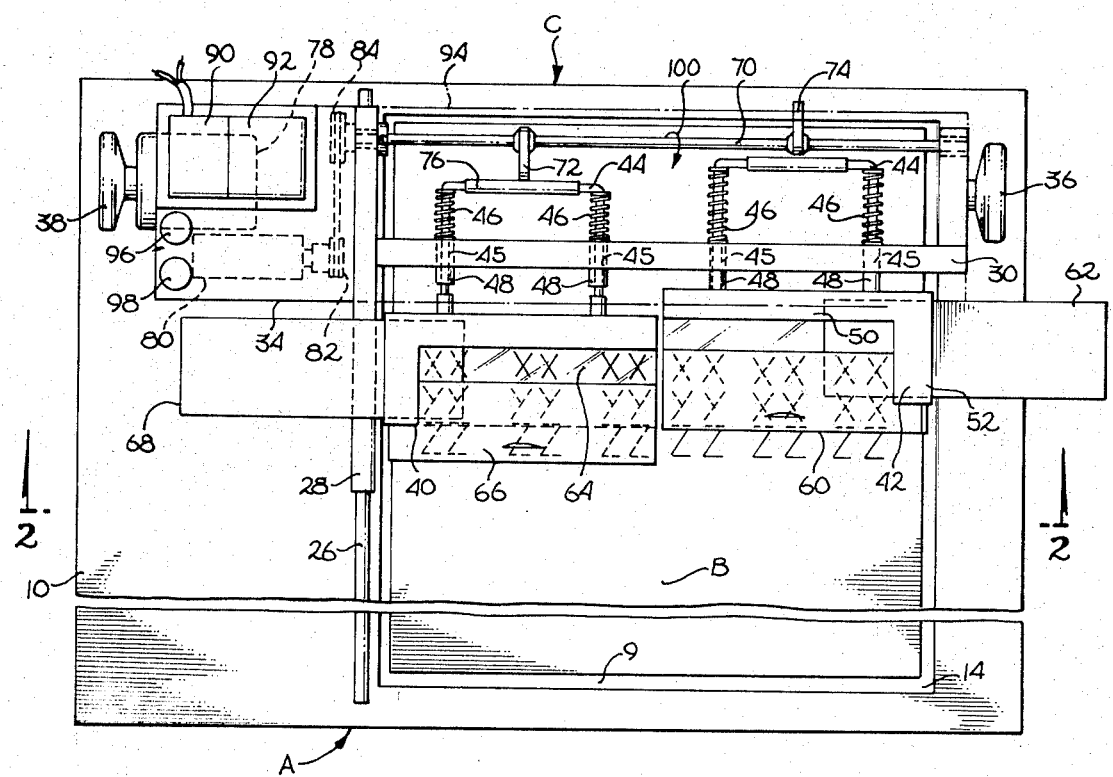
FIG. 1 is a top plan view of an embodiment of the present invention.
Figure 2:
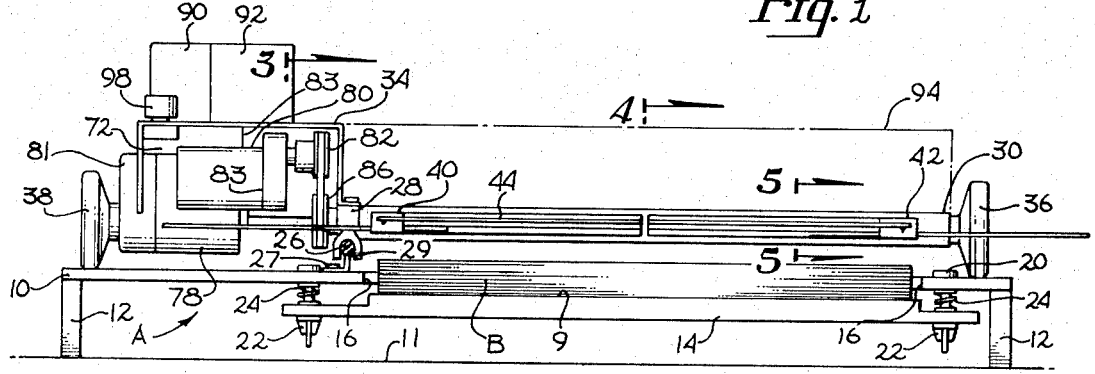
FIG. 2 is a partial front elevation view taken along the line 2—2 of FIG. 1.
Figure 3:
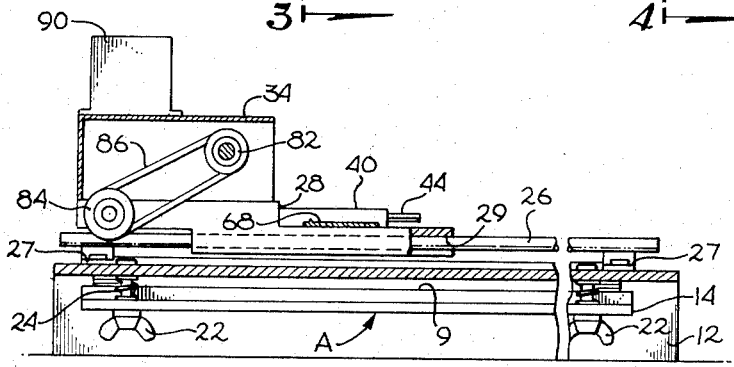
FIG. 3 is a partial cross-section taken along the line 3—3 of FIG. 2.

Referring now to the drawings, and more particularly to FIGS. 1 through 3, an embodiment of the present invention is illustrated which basically comprises the base member A, upon which selected reading material B may be exposed to view, and the pacing member assembly C, which is adapted for rectilinear traversal of the reading material B from the top to the bottom thereof in a plane above and substantially parallel to the base member A.

While the details of the base member A, and the support surface 9 on which the reading material B is placed, may be varied with some facility, an embodiment of the present invention is illustratively shown in FIGS. 1 and 2 wherein a base board 10 is supported on a table 11 by the base support members 12, which support members may be of any suitable configuration and fixture adaptable to provide a secure base for the operation of the present invention. In the illustrative embodiment, the reading material support surface 9 is vertically adjustable with respect to the pacing member assembly C in order to accommodate reading materials of varying thicknesses. The reading material support member 14 is depended from the base board 10, directly beneath a substantially rectangular opening 16 defined through the base board, by any suitable means such as the bolts 20 and retaining nuts 22 placed at the four corners of the member 14. The material support member 14 is preferably constructed to define a substantially rectangular raised portion of slightly smaller dimensions than the opening 16 (as depicted in FIG. 2) in order to accommodate reading material placement as close to the pacing member assembly as may be desired. The biasing springs 24 may be interposed between the underside of the base board 10 and the reading material support member 14 in order to insure the security of the base member. Thus, by appropriate adjustment of the retaining nuts 22, the reading material may be selectively vertically positioned with respect to the pacing member assembly C.

The pacing member assembly C structurally comprises the traverse guide 28; the substantially L-shaped framework member 30 extending from the traverse guide 28 across the opening 16; the motor support member 34; and, the spacing shutters 40, 42 and their associated assemblages which will be described with greater detail hereinafter.

In order to best effectuate the objects of the present invention, it is preferable that the pacing member assembly rectilinearly traverse the reading material in the direction of normal reading progress, that is, from the top to the bottom of the reading material. While a number of mechanisms may be employed to insure such rectilinear motion, such as continuous screw assemblies, locked channel guides, or other mechanical equivalents, the illustrated embodiment includes the elongate traverse rail 26 mounted on the base board 10 adjacent the opening 16, by means of the brackets 27, to extend substantially parallel to the entire length of the reading material support surface 9. The traverse guide 28 defines the guide channel 29 for slidable engagement with the traverse rail 26. In the illustrative embodiment, it is preferable that the traverse guide 28 be of sufficient length, and that the channel 29 be of such dimension, that the pacing member assembly smoothly and rectilinearly traverse the reading material.

The pacing member assembly C is illustratively supported on the base member A above the reading material support surface 9 by the wheels 36, 38; wheel 36 being suitably journaled for a rotation within the outermost portion of the framework member 30. The other support wheel 38 is mounted for rotation on the drive motor 70 as more clearly explained hereinafter.

The spacing shutters 40, 42 may be mounted on the laterally extending portion of the framework member 30 to extend therefrom in a plane above and substantially parallel to the reading material support surface 9. In the illustrative embodiment, the substantially U-shaped shutter support members 44 are supported within openings 45 defined by the laterally extending portion of the framework member 30 so that their open ends project toward the bottom of the reading material B. The cross-sectional dimension of the support members 44 are slightly less than their respective supporting openings 45 to permit the members 44 to move freely therethrough. As it is preferable that the spacing shutters 40, 42 be limited to rectilinear movement with respect to the framework member 30, the width, or thickness, dimension of the member 30, and the dimension of the openings 45 therethrough with respect to the support members 44, may be appropriately selected so that the member 30 serves such motion limiting function. The support members 44 may be affixed at their open ends to an edge of the shutters 40, 42 by any convenient means such as welding, braising, etc. While there are but two spacing shutters with their associated members illustratively depicted, additional shutters may be similarly movably affixed if so desired.

In accordance with the construction of the illustrated embodiment of the present invention, it has been found preferable to retain the freely movable spacing shutters 40, 42 in a normal first, or starting position, while permitting their movement to and from such first position. Accordingly, the shutter bias springs 46 are compressively interposed between the closed ends of the shutter support members 44 and the framework member 30 to encircle each of the legs of the members 44, thereby tending the shutters 40, 42 into abutment with the framework member 30. While not critical to the present invention, the shutters 40, 42 are prevented from abutting the framework member 30 by the interposition of the spacers 48 between the framework member 30 and the shutters 40, 42 through which the legs of the support members 44 are free to move. Thus, the spacing shutters 40, 42 are constructed to be rectilinearly movable with respect to the framework member 30 in a plane above and substantially parallel to the reading material support surface 9, and hence reading material placed thereon.

It will be realized that spacing shutter configurations may vary widely, the primary objective being to provide a means for exposing, or defining, word-group areas of the underlying reading material in a sequential manner. For example, the shutters may be of a fixed square-, rectangular-, or U-shaped configuration. In like manner, where shutter adjustability is desirable to vary the word-group area so exposed or defined, various adjusting means may be utilized such as a single, wrap-around slidable member, or more complex fixed members with internally movable shutter parts. In the illustrative embodiment, each of the spacing shutters 40, 42 comprises an L-shaped member having the longest leg 50 thereof disposed adjacent the framework member 30 and the shorter leg 52 extending substantially perpendicularly to the leg 50. Referring now to FIGS. 5 and 6, the spacing shutter 42 is constructed to have a substantially E-shaped cross-section to include the upper and lower retaining grooves 54, 56, respectively, defined about the interior periphery of the shutter. A substantially rectangular interior optical member 57, comprising any suitably transparent material, may be affixed to the interiorly projecting surface of the land 55, defined between the grooves 54, 56, to form additional support and guidance for the movable blocking, or limiting, members 60 and 62. The blocking member 62, a substantially rectangular member of opaque material slightly larger than the interior area defined by the legs 50, 52, is slidable below the transparent member 57 with one edge thereof engageable within the lower groove 56 defined by the leg 50. The blocking member 62 includes on its uppermost surface the raised portion 61 which cooperates with the notch 59 defined in the top of the groove 56. Blocking member 60 is similarly constructed to be slidably retained by the upper groove 54 and notch 58. Thus, the blocking members 60, 62 slidably cooperate with the shutter 42 to form an adjustable means for defining, or exposing, a predetermined area of underlying reading material such as that comprising the X's depicted in FIG. 6. In like manner, the blocking members 66, 68 slidably cooperate with the shutter 40 to define adjacent areas of reading material.

Figure 9:
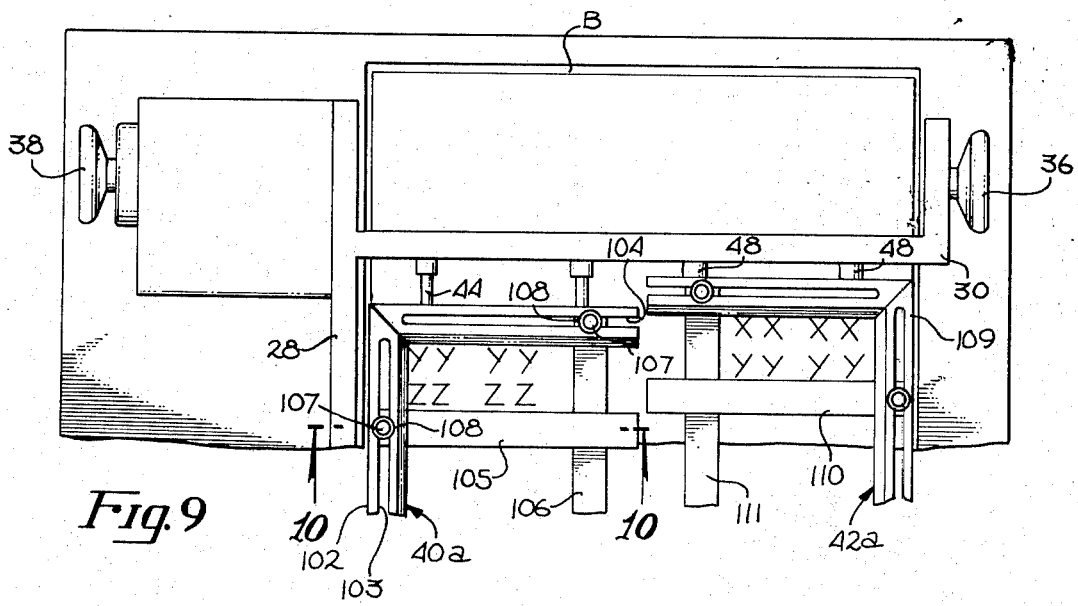
FIG. 9 is a partial top plan view of the present invention showing an alternative embodiment of a portion thereof.
Figure 10:
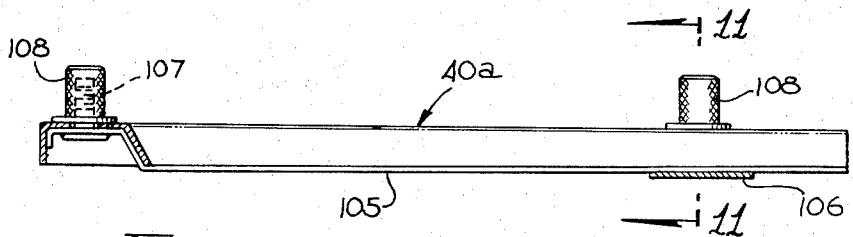
FIG. 10 is a partial cross-section view taken along the line 10—10 of FIG. 9; and, FIG. 11 is a partial cross-section view taken along the line 11—11 of FIG. 10.
Figure 11:
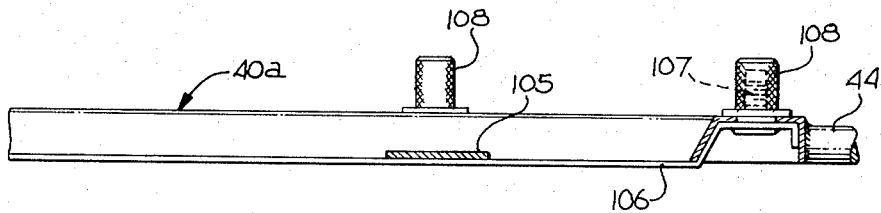

Referring now to FIGS. 9 through 11 there is illustratively depicted an alternative configuration for the spacing shutters 40,42, which, for the purposes of clarity, are identified by the corresponding subscripted reference numerals 40a; 42a.

With particular reference to FIG. 10, the shutter 40a includes the substantially L-shaped framing track member 102 which defines the slots 103, 104 extending inwardly from the extreme ends of each of the legs of the track member 102. The track member 102 may be affixed to the support members 44 in the manner depicted by welding or the like. The "reading area" to which the reader's attention is to be directed is defined by the legs of the track member 102 and the adjustable limiting bars 105, 106, depended and extending substantially normally from the legs of the track member 102 as depicted. Each of the limiting bars 105, 106 includes at one end thereof a threaded pair 107 having a cross-sectional configuration compatibly engageable with the slots 103, 104 to thus permit selective positioning of the bars at predetermined positions along the legs of the track member 102. Each of the bars 105, 106 may be independently locked in position by means of the internally threaded lock nuts 108.

In a similar manner, the shutter 42a is constructed to adjustably define an adjacent "reading area" circumscribed by the legs of the track member 109 from which are depended the adjustable limiting bars 110 and 111.

As indicated hereinbefore, the spacing shutters 40,42 (40a, 42a) are adapted for rectilinear movement with respect to the framework member 30. Referring now to FIGS. 1 and 4, there is illustratively depicted a means for imparting such motion to the shutters. A cam shaft 70 is rotatably fixed at one end thereof within the framework member 30 to extend laterally across and above the reading material support surface 9 for a rotatable support through the traverse guide 28. A portion of the cam shaft 70 may extend beyond the traverse guide 28 to accommodate the pulley 84. The eccentric cams 72, 74 are fixed to the cam shaft 70 for rotation therewith at points immediately adjacent the closed ends of the shutter support members 44. The cams 72, 74 are disposed relative to one another such that their high points of eccentricity are diametrically opposed. As the cam shaft 70 is rotated, each of the cams 72, 74 alternatively impinges upon the respectively adjacent cam rollers 76 disposed about the closed ends of the support members 44. Thus, in cyclical sequence, as the cam shaft 70 is rotated through 360°, one spacing shutter is rectilinearly moved away from its first, or starting, position a distance equal to the eccentric height of its adjacent cam and returned to its first position, and then the second shutter is moved through a similar cycle.

Referring now to FIGS. 2, 3, and 8, an illustrative manner in which drive power may be supplied to the pacing member assembly is depicted. The pacing member drive motor 78, a direct current motor well known in the art for the uses described, is depended from the drive means support member 34 by a suitable bracket assembly 79. The drive motor 78 is adapted to receive at its outwardly projecting end the aforementioned support wheel 38. The support, or drive wheel, 28 may be either directly connected to the armature of the motor 78 for rotation therewith or indirectly coupled through a suitable reduction transmission means 81 as depicted. A second direct current drive motor 80, also depended from the support member 34 by the bracket 83, has its armature connected to the pulley 82, preferably through the reduction transmission means 83. The pulleys 82 and 84 are arranged to be in substantial lateral alignment. The drive belt 86 interconnects the pulleys 82 and 84. It will, of course, be obvious that other drive mechanisms for imparting rotation to the wheel 38 and the cam shaft 70 may be utilized such as intermeshing gear assemblages or other mechanical equivalents.

Both motors, 78 and 80, are supplied with electrical energy from the standard 115 volt alternating current service outlet 88 found in virtually all homes and business establishments. An alternating current to direct current rectifying reducing transformer 90 provides the necessary input conversion from alternating current to the direct current requisite to operation of the motors 78, 80. While suitable mechanical or electrical equivalents may be substituted, in order to cause the pacing member assembly C to traverse the selected reading material in a series of predetermined hesitations, or steps, an interrupter device 92, such as a commutator, is inserted in the circuit between the rectifier 90 and the pacing member drive motor 78 so that the motor 78 receives a pulsating direct current.

As it has been found desirable to vary the speed with which the pacing assembly C traverses the reading material, and, concomitantly, the rotational rate of the cam shaft 70, rheostat speed controls 96 and 98 well known in the art may be utilized to control the speed of the motor 78 and 80, respectively.

The structure of the illustrated embodiment of the present invention may also include the housing 94 (here illustrated in phantom presentation in FIGS. 1 and 2 only), made of sheet metal, plastic or other similarly suitable material, to protectively cover the electrical and operative components of the present invention as well as to aid the reader by removing from view the moving parts that may otherwise distract his attention from the areas defined or exposed by the spacing shutters 40, 42.

Having thus illustratively described the structural configuration of an embodiment of the present invention, there follows an operational description thereof. Broadly stated, in preferred operation, the entire pacing member assembly C is driven to traverse the reading material B in a series of hesitations, or steps, at a rate commensurate with the reader's ability. During each hesitation, or step, the cam shaft 70 is rotated through 360° thereby causing the shutter 40 (40a) to expose the first area of reading material to which the reader's attention is directed, and to sequentially block the same area from view while causing the shutter 42

(42a) to expose the progressively adjacent reading material. The pacing member assembly then progresses down the reading material another "step" and the cyclic movement of the spacing shutters is repeated. By visually fixing upon each of the areas of reading material thus exposed by the spacing shutters, the reader is trained to develop the rhythmic word-group fixation found to be of great assistance in achieving high reading rates.

As a more specific example of the operation of an embodiment of the present invention, it is assumed that reading material B, including the relatively large words "XX," is to be used during the early training stages of a reader. The primary objective of the use of the present invention is to first familarize the reader with the concept of simultaneously and comprehensibly seeing a plurality of words, or word-groups, and then to rhythmically transfer this word-group eye fixation to progressive portions of the reading material. As the reader's habits are thus developed, by appropriate adjustment of the "reading area" definition members 66, 68(102,105,106) and 60, 62(109,110,111) and the speed controls 96, 98, greater areas of the reading material may be exposed at more rapid fixation transfer rates. Accordingly, referring to FIG. 1, during the first "step" of the pacing assembly C, the cam shaft 70 is rotated through 90° in the direction of the arrow 100 causing the first word-group to be exposed under the area of the transparent member 64 defined by the shutter 40 and the blocking members 66,68, while the adjacent material is blocked from view by the member 60. Referring to FIG. 6, the cam shaft 70 continues its rotation through 270° causing the member 66 to block the first word-group from view and causing the shutter 42 to expose the next word-group in reading progression under the area of the transparent member 57 defined by the shutter 42 and the blocking members 60, 62. Referring now to FIG. 7, as the cam shaft 70 completes its 360° rotation and commences a new cycle through 90° of rotation, the pacing member assembly C has "stepped" down to its next hesitation point, thus exposing the sequentially progressive area of the reading material (the "YY" word-groups) while blocking the adjacent area from view. It will, of course, be understood that while the foregoing operational description of the present invention is made with reference to the shutter configuration 40,42, the functional operation remains substantially identical with the substitutes of the shutter configuration 40a, 42a.

There has thus been described a new and useful reading training device which overcomes the limitations of other apparatus presently known in the art. It will be understood that while a detailed description of the present invention has been set forth with respect to illustrative embodiments thereof, the true scope and definition of the present invention is as stated in the following claims.

What is claimed is:

1. A reading training device comprising in combination:
   a. a base member including a reading material support surface upon which reading material is placed, and further including a rectilinear guide member affixed adjacent said support surface to extend from the top to the bottom of said support surface;
   b. a pacing member extending above and across said support surface, said pacing member being constructed to movably engage said guide member so as to rectilinearly traverse said support surface from the top to the bottom thereof in a plane substantially parallel thereto, said pacing member further comprising:
      1. a framework extending above and across said support surface;
      2. one each of a pair of support wheels disposed at opposite ends of said framework, each of said support wheels being in rotatable contact with said base member;
      3. a pair of spacing shutters affixed to said framework for rectilinear co-planar movement with respect thereto, each of said spacing shutters being constructed to expose laterally adjacent areas of said reading material;
      4. biasing means interposed between each of said shutters and said framework tending to maintain said shutters in a first position;
      5. a cam shaft rotatably affixed to said framework adjacent said spacing shutter; and,
      6. a pair of eccentric cam members mounted for rotation with said cam shaft whose high points of eccentricity are substantially diametrically opposed, one each of said cam members being disposed adjacent each of said spacing shutters to impart cyclical rectilinear movement to each of said shutters against said biasing means during rotation of said cam shaft;
   c. variable speed motor means adapted to impart periodic rotation to one of said support wheels whereby said pacing member is caused to interruptedly traverse said support surface at a predetermined rate; and,
   d. variable speed motor means adapted to impart continuous rotation to said cam shaft.

2. In the combination defined in claim 1 wherein said base member includes means for vertically adjusting said material support surface with respect to said pacing member to accommodate varying thicknesses of reading material.

3. The combination defined in claim 1 and further including:
   a. a base member comprising a flat surface and support means depending therefrom, said flat surface defining an opening therethrough disposed beneath said pacing member;
   b. a flat reading material support member including an upper reading material support surface, said support member being disposed below said opening; and,
   c. means for adjustably depending said support member from said base member whereby the distance between said material support surface and said pacing member may be selectively determined.

4. The combination defined by claim 1 and further including means for adjusting said spacing shutters to selectively expose varying areas of said reading material.

5. In the combination defined in claim 1 wherein each of said spacing shutters further comprises a substantially L-shaped framing member having one leg thereof movably affixed to said pacing member, said framing member being constructed to receive a first opaque limiting member slidable along one leg of said framing member, and a second opaque limiting member slidable along another leg of said framing member, whereby areas of said reading material of varying sizes may be exposed by selective adjustment of said limiting members.

6. The combination defined in claim 1 and further including means for varying the speed at which said pacing member traverses said reading material.

* * * * *